United States Patent
Eyberg

(10) Patent No.: US 11,061,695 B2
(45) Date of Patent: *Jul. 13, 2021

(54) UNIKERNEL PROVISIONING

(71) Applicant: NanoVMs, Inc., San Francisco, CA (US)

(72) Inventor: Ian Eyberg, Oakland, CA (US)

(73) Assignee: NanoVMs, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/803,866

(22) Filed: Feb. 27, 2020

(65) Prior Publication Data
US 2020/0272482 A1 Aug. 27, 2020

Related U.S. Application Data

(63) Continuation of application No. 15/950,967, filed on Apr. 11, 2018, now Pat. No. 10,628,177.

(51) Int. Cl.
*G06F 9/445* (2018.01)
*G06F 9/455* (2018.01)
*G06F 9/54* (2006.01)

(52) U.S. Cl.
CPC ...... *G06F 9/44521* (2013.01); *G06F 9/45508* (2013.01); *G06F 9/45558* (2013.01); *G06F 9/541* (2013.01)

(58) Field of Classification Search
CPC ............ G06F 9/44521; G06F 9/45558; G06F 9/45508; G06F 9/541; G06F 8/63
See application file for complete search history.

(56) References Cited

U.S. PATENT DOCUMENTS

| | | | |
|---|---|---|---|
| 8,578,000 B2 | 11/2013 | Van Wie | |
| 9,766,921 B2 | 9/2017 | Allen | |
| 9,886,303 B2 | 2/2018 | Koller Jemio | |
| 9,904,527 B1 | 2/2018 | Miller | |
| 2002/0099765 A1* | 7/2002 | Otis | G06F 12/0276 709/203 |
| 2004/0194116 A1* | 9/2004 | McKee | H04M 3/42136 719/318 |
| 2008/0098179 A1* | 4/2008 | Kilbane | G06F 12/0811 711/147 |
| 2009/0119651 A1 | 5/2009 | Slattery | |
| 2011/0307663 A1 | 12/2011 | Kultursay | |
| 2015/0033354 A1 | 1/2015 | Wichmann | |

(Continued)

OTHER PUBLICATIONS

Bratterud et al. "IncludeOS: A minimal, resource efficient unikernel for cloud services." Cloud Computing Technology and Science (CloudCom), 2015 IEEE 7th International Conference on IEEE, 2015. [Retrieved on Nov. 28, 2018]. Retrieved from the internet: <URL: http://folk.uio.no/paalee/publications/2015-cloudcom.pdf>.

(Continued)

*Primary Examiner* — Tuan C Dao
(74) *Attorney, Agent, or Firm* — Van Pelt, Yi & James LLP

(57) ABSTRACT

Unikernel provisioning is disclosed. A binary is received. The received binary is converted into a unikernel that is deployable on a virtual machine at least in part by generating a disk image comprising the received binary, a loader for loading the received binary, and portions of an operating system required to execute the received binary.

28 Claims, 3 Drawing Sheets

(56) References Cited

U.S. PATENT DOCUMENTS

| | | |
|---|---|---|
| 2015/0268978 A1 | 9/2015 | Vu |
| 2016/0087933 A1* | 3/2016 | Johnson .................. H04L 67/34 709/245 |
| 2017/0132430 A1 | 5/2017 | Sikka |
| 2017/0155724 A1 | 6/2017 | Haddad |
| 2017/0192825 A1 | 7/2017 | Biberman |
| 2017/0364377 A1* | 12/2017 | Koller Jemio ...... G06F 9/45533 |
| 2017/0366455 A1 | 12/2017 | Pongracz |
| 2018/0025152 A1 | 1/2018 | Ben Ali |
| 2018/0046446 A1* | 2/2018 | Turovsky .................. G06F 8/71 |
| 2018/0069793 A1 | 3/2018 | Narayanan |
| 2018/0074843 A1* | 3/2018 | Smith ................. G06F 9/45558 |
| 2018/0091449 A1 | 3/2018 | Tellez |
| 2018/0115585 A1 | 4/2018 | Rubakha |
| 2018/0165110 A1 | 6/2018 | Htay |
| 2019/0018715 A1 | 1/2019 | Behrendt |
| 2019/0104172 A1* | 4/2019 | Wu ........................... G06F 8/63 |
| 2019/0205241 A1* | 7/2019 | Huici ....................... G06F 8/63 |

OTHER PUBLICATIONS

Madhavapeddy et al., "Unikernels: Library operating systems for the cloud", Mar. 16-20, 2013, [Retrieved on Oct. 24, 2019]. Retrieved from the internet: <URL: https://dl.acm.org/citation.cfm?id=2451167> 12 Pages (461-472) (Year: 2013).

Sharma et al., "Containers and Virtual Machines at Scale: A Comparative Study", 2016, [Retrieved on Oct. 24, 2019]. Retrieved from the internet: <URL: http://homes.sice.indiana.edu/prateeks/papers/a1-sharma.pdf> 13 Pages (1-13) (Year: 2016).

* cited by examiner

UNIKERNEL PROVISIONING

CROSS REFERENCE TO OTHER APPLICATIONS

This application is a continuation of co-pending U.S. patent application Ser. No. 15/950,967, entitled UNIKERNEL PROVISIONING filed Apr. 11, 2018 which is incorporated herein by reference for all purposes.

BACKGROUND OF THE INVENTION

In existing techniques for building unikernels, access to the source code of a user application is typically required. However, source code for certain applications may be proprietary, or otherwise not always accessible. This limits the applications for which unikernels can be built.

BRIEF DESCRIPTION OF THE DRAWINGS

Various embodiments of the invention are disclosed in the following detailed description and the accompanying drawings.

DETAILED DESCRIPTION

Figure 1:
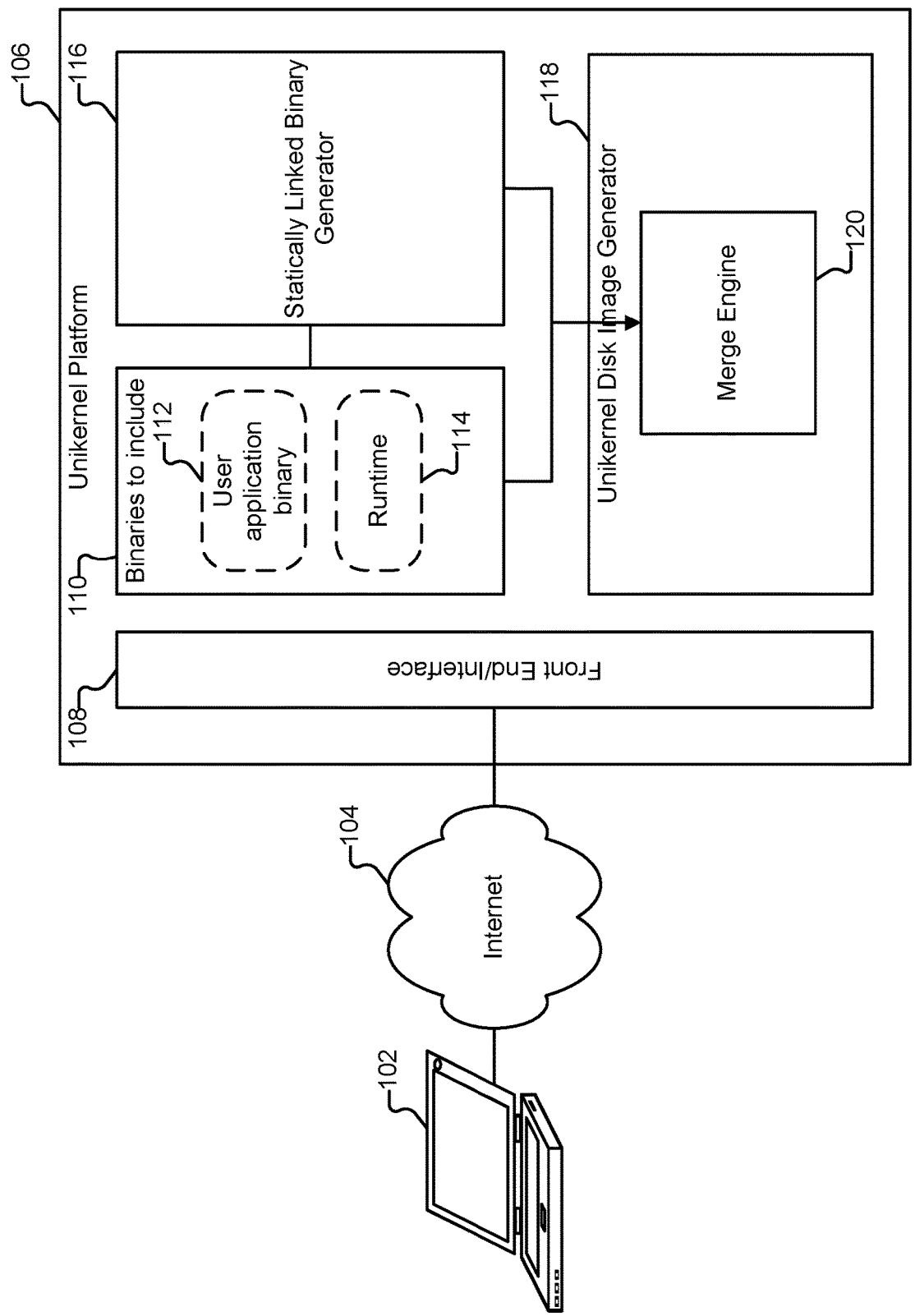
FIG. 1 illustrates an embodiment of a system for building a unikernel.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Described herein are techniques for converting an existing binary into a unikernel. The unikernel includes the binary or executable file/object of an application to be run and only those portions of an operating system that are needed to form the unikernel. The unikernel may then be deployed and booted into on a virtual machine (VM) hypervisor or on bare metal, without a host or underlying operating system.

In the examples described herein, unikernels are single processes, cannot be sshed into, and include only those parts of an operating system that are needed for the process to run. This results in various efficiency and security benefits.

For example, with respect to efficiency, due to the unikernel including only the minimal components needed for the single process application to run, the average size of a unikernel may be kept smaller than that of a typical application running on a traditional operating system. This reduces the amount of memory used. Further, due to the relatively small size of the unikernels, many vms (e.g., thousands) may be implemented on a single commodity host, which may be orders of magnitude greater than the number of vms that can be spun up on traditional systems.

As another example, when booting up a unikernel, the unikernel boots straight into the application. There is no initialization process that spawns off multiple processes. This is in contrast to traditional operating systems, where, for example, when booting into Linux, BSD, etc., a process scheduler is started. As the unikernel is a single process system, such process scheduling is not performed. This, coupled with the smaller size of the unikernels, also results in faster boot times.

As another example benefit, unikernels, when deployed, are isolated, single process systems (versus, for example, a multi-process system such as Linux). Thus, shared memories/address spaces are not needed. For example, in a multi-process operating system such as Linux, there is an address barrier between different processes, which will have different virtual address spaces. The barrier is to ensure that processes do not overwrite each other's memory addresses. Context switching (e.g., between user space and kernel space and/or between processes) is performed. With unikernels, which are single process, such context switching need not be performed. Thus, the overhead to managing different address spaces is removed, resulting in faster and more efficient running of the application.

Running unikernels also provides various security benefits relative to applications run on traditional operating systems. As described above, unikernels, once deployed, cannot be accessed through a channel such as that provided by SSH (Secure Shell). For example, users may be unable to log into deployed unikernels. Further, shell code cannot be executed on the single process unikernel system. This removes shell code exploits as an attack vector.

Described herein are techniques for converting a binary of an application into a unikernel virtual machine. As will be described in further detail below, using the techniques described herein, when building the unikernel, access to the source of the application is not needed. Instead, the unikernel is built by combining the binary of the application into a unikernel disk image with a loader and only those portions of an operating system that are needed for the binary to run to implement a minimal virtual machine. These portions of the operating system include portions of an operating system kernel (e.g., network and disk drivers). The portions of the operating system also include any dependencies that the application relies on, such as libraries and header files. Thus, using the techniques described herein, any ad hoc binary can be run as a unikernel, with the unikernel being built without requiring access to source code of an application. Thus, proprietary applications (i.e., applications for which the source code is not made accessible, such as .NET applications, SAP Hana applications, etc.) can be run as unikernels.

Build Environment

FIG. 1 illustrates an embodiment of a system for building a unikernel. In this example, a binary is converted into a unikernel that can be deployed, for example, as a virtual machine on a hypervisor.

In this example, suppose that a user (e.g., a DevOps user) wishes to run an electronic medical records (EMR) application as a unikernel. In this example, suppose that the EMR application is written on the .NET framework (e.g., in the programming language C#), for which access to the source code of the EMR application is not available. As will be described in further detail below, despite there not being access to the source code for the EMR application, the application may nonetheless be run as a unikernel using the techniques described herein.

In order to build the unikernel for the EMR application, the user provides (e.g., over network 104 such as the Internet) a .NET assembly of the binary of the EMR application to unikernel platform 106. As one example, the user, using device 102, accesses a configuration user interface (e.g., browser-based web interface) provided by front end 108 to platform 106. Via the provided interface, the user uploads or otherwise provides the binary of the EMR application (also referred to herein as user application binary 112). In this example, for illustrative purposes, the EMR application is uploaded as a binary in the PE32 (Portable Executable) format.

Platform 106 is configured to convert the received binary into a unikernel virtual machine. In this example, platform 106 includes unikernel disk image generator 118. Unikernel disk image generator 118 is configured to generate a disk image for a unikernel that will include the binary of the EMR user application as well as any components (e.g., portions of an operating system) required to run the user application as a unikernel. The various components will be included at various positions in the disk image (e.g., placed a certain number of bytes in).

In this example, when the disk image for the unikernel is built, the disk image is created in an isolated build environment (separate, for example, from other unikernel disk image builds). Within the build environment, the various components that are needed to build the disk image are included in the disk image being generated. In this example, the isolated build environment cannot be reconfigured and cannot be sshed into. Within the build environment, the various components that are needed to build the image, such as libraries upon which any binaries to be executed rely on, are cloned in.

In this example, suppose that the PE32 EMR application binary that is received by platform 106 is placed into a build chroot with a preset environment. In this example, the type of binary that is received is determined. For example, it is determined that the EMR application has been received in the PE32 .NET assembly format. In order for the PE32 binary to execute, it must run within a .NET runtime, which will interpret the PE32 binary (e.g., interpret the byte code of the .net assembly) during execution time/runtime (i.e., when the unikernel is deployed on a hypervisor). Thus, because the user has requested that a .NET assembly is to be run as a binary, platform 106 determines that a .NET runtime should also be included in the unikernel disk image. Examples of .NET interpreters/runtimes include the Mono runtime or the common language interpreter/runtime (CLR). Such runtimes are used to interpret the PE32 to object code that a virtual machine can execute. Other examples of binaries or applications that also require runtime interpreters are those that rely on the JVM runtime interpreter.

In this example, for illustrative purposes, suppose that the Mono runtime (e.g., runtime 114) is to be included in the unikernel disk image to be generated in the build environment. In some embodiments, the .NET runtime to be included in the disk image is automatically selected. In other embodiments, the .NET runtime/interpreter to be included is user-specified. An instance of the .NET runtime is then also received (e.g., a cached copy of the .net runtime is obtained and received by the build environment) and cloned into the build environment.

Thus, as shown in this example, the .NET runtime 114 and binary 112 of the EMR application are included in the set of binaries of 110 to include in the unikernel disk image being built.

In this example, suppose that the Mono runtime interpreter is a dynamically linked binary (e.g., Executable and Linkable Format (ELF) file). For example, for illustrative purposes, suppose that the Mono runtime is in the ELF64 format. Because the Mono runtime is dynamically linked, the Mono interpreter will ultimately require being linked to various libraries (e.g., libc, libssl, vDSO, libm, librt, libthread, liblinux, etc.) in order to execute and interpret the .NET assembly byte code of the user provided PE32 binary (that will live in the .NET Mono runtime).

In this example, when building the unikernel disk image, two options are provided for linking the Mono runtime, where the linking also further includes symbol resolving. The first option is to, at unikernel build time, link the Mono runtime to generate a standalone statically linked Mono runtime binary. The second option is to configure the unikernel disk image such that the Mono runtime will be dynamically linked at runtime (e.g., when the unikernel is deployed as a virtual machine on a hypervisor at runtime).

The first option of generating the statically linked Mono runtime binary is described here first. The second option, in which the Mono runtime is dynamically linked at runtime, will be described in further detail below.

In this example, the Mono runtime 114 is passed to statically linked binary generator 116, which is configured to transform the dynamically linked Mono runtime into a standalone, statically linked binary.

One example of generating a statically linked binary is as follows. The Mono runtime executable is loaded up into memory. All of the libraries required by the Mono runtime executable are loaded up and linked to the Mono runtime executable. As part of the linking, symbol resolution is also performed. Before the Mono runtime is executed, a snapshot of the linked Mono runtime executable is taken in memory, where the snapshot is outputted as a standalone, statically linked object.

Thus, the dynamically linked Mono runtime binary has been converted into a standalone, statically linked executable version of the Mono runtime binary. The statically linked binary is now portable, and includes whatever libraries are required by the Mono runtime. In some embodiments, tools such as Statifier or Ermine are used to implement the statically linked binary generator 116.

As part of the linking process, memory layout preparation is performed. Also, as part of the linking, resolving of symbols in the libraries is also performed, where symbols are resolved, de-mangled, and placed in appropriate positions/addresses. For example, there may be multiple libraries that are linked into the Mono runtime. The multiple libraries to be linked may include repeated references to a function or duplicate definitions of a function. Such duplicate or repeated references are resolved so that the user application can be cleanly executed. For example, suppose that there are two libraries, which each issues read system calls. There are multiple pieces of code that are expecting read to be at a certain address in the final executable. This is resolved as part of the linking process. This ensures that the read function is at a single address known to both libraries. Thus, symbols in the programs to be executed are associated with specific code from the library, and named symbols are translated into memory locations.

As one example, read may be called and defined multiple times (e.g., to read from a file descriptor, where a file descriptor is a special object that points to a file or a network socket). The read function code/routine will be stored at a single address, where all other references to the read function/symbol name will be resolved to the same address. Thus, when various library or other object files are linked in together (where, for example, one library may have code that calls a function defined in another library), any duplicate labels in the objects are resolved to their correct addresses.

As another example, throughout the libraries to be linked to the Mono runtime, there may be duplicates of the same named variable. Multiple copies of the same variable should not be addressed, in particular, for example, if the variable is a global one. In some embodiments, the symbol resolving includes deduplicating global variables into a single copy. Different references to the same variable are resolved to the same address for the variable. As another example, a library may declare variables, where some are allocated at runtime, and others are statically declared and allocated before a program is even run. Thus, when the program is booted up, the statically declared variable will already have some memory allocated to it. The resolving ensures that all symbols across various libraries and programs will resolve to the same memory address for which the variable resides. Thus, in the static linking option, some of the variables are statically declared and allocated memory before the Mono runtime is executed.

As will be described in further detail below, the standalone Mono runtime executable (e.g., in the ELF64 format) generated as output of the processing performed by statically linked binary generator 116 will then be incorporated (along with the PE32 EMR application binary) onto the unikernel disk image being generated.

In this example, the unikernel disk image that is built will include both the end user's application code (in the form of the received binary), the statically linked Mono runtime, as well as system code corresponding to the portions of an operating system required for the EMR application to run (e.g., a minimal set of libraries corresponding to portions of an OS that implement mechanisms or services to drive hardware or communicate network protocols—e.g., device drivers, file systems, threads, networking, etc.).

Unikernel disk image generator 118 is configured to generate a unikernel disk image. The unikernel disk image generator is configured to generate a disk image that includes system code that will execute at runtime, when the unikernel is deployed as a virtual machine (e.g., spun up on a hypervisor). The system code included in the disk image includes code for booting up the unikernel, as well as underlying runtime code for implementing calls or requests for services made by the EMR application (via the Mono runtime) and to interact with a virtual machine's resources. Unikernel disk image generator 118 further includes merge engine 120, which is configured to incorporate the received binaries (Mono runtime and .NET assembly byte code) into the disk image, which can then be outputted and deployed on a hypervisor as a unikernel virtual machine.

The unikernel disk image includes code for booting up the unikernel system. This includes a bootloader that performs system initialization and setup. The bootloader is placed in the master boot record of the disk image at a known location so that it can be accessed by a BIOS or UEFI at unikernel virtual machine bootup. When the virtual machine is spun up, BIOS code is run, with a limited amount of memory available to be addressed. After the BIOS performs its operations, it jumps into the bootloader at the predefined address or location. The bootloader provides the handoff between the BIOS to the unikernel system, where the bootloader takes control from the BIOS to load up the unikernel system. In some embodiments, because the same bootloader code may be used across different builds, a copy of the bootloader that is already compiled is cached and used in the build environment. In this way, the bootloader code need not be recompiled each time a unikernel disk image is built.

The bootloader includes successive stages of code that are executed as more and more memory is made accessible. For example, the bootloader begins by enabling 16 bit mode (from 8 bit mode), disabling the pic/hardware timer, and enabling the A20 line. The A20 line will allow the unikernel system to access more than 4 GB of memory. In the next stage, the bootloader jumps from 16 bit mode to 32 bit mode. Code for setting up the Global Descriptor Table (GDT) is also included. This code, when executed, places various descriptors in the GDT and separates data segments from code segments. 64 bit mode is also jumped into. When performing the unikernel setup processing described herein, the various stages may be combined together or further divided into sub-stages to perform the setup or initialization.

A loader is further included in the disk image. In this example, the loader is configured to load, at runtime (when the unikernel is deployed on a hypervisor), the Mono interpreter. The loader may be placed at an appropriate location of the file system layout (of the file system added to the disk image as part of the build environment, described in further detail below). The loaded Mono runtime binary will be read to read sectors, create memory regions, allocate memory, etc. Loading the Mono runtime also includes reading symbols from a known location of the Mono runtime in order to perform symbol interpolation. Performing symbol interpolation includes merging the symbols of the Mono runtime ELF with unikernel system symbols. Symbol interpolation further includes the storing of addresses and function names for components of the kernel or lower level code needed to support the code interpreted and executed by the Mono runtime (when running the PE32 application).

An example of symbol interpolation that is to be performed at unikernel bootup (according to the code inserted in the disk image as part of the build process) is as follows. The portion of the loaded ELF binary that includes a list of all symbols for the Mono runtime and its linked libraries is read and the list of all symbols is obtained. Symbol interpolation creates a table of symbols that provides a mapping or location that stores, for each symbol (e.g., function, variable, etc.), the address of the symbol and the callee name of the corresponding function. The table will include both the user level symbols (e.g., those defined in the EMR application, Mono runtime, and linked libraries) as well as system calls (which form the kernel portion of the unikernel system).

When symbols are initialized, a heap will be allocated (according to a number of pages), then the table is allocated, where the heap is used to store the symbols and their corresponding addresses. Thus, at runtime, the code to be executed for implementing the various functions of the EMR application/Mono runtime may be identified and executed.

For example, suppose that the EMR application is configured, as part of its code, to make a network call into a database. The database call may be made using a higher level library call. However, various lower level calls (e.g., kernel service/system calls) may need to be called in order to implement the database write. For example, the network call may call out to a socket, which then issues a read or write. The lower level networking calls and system calls such as read or write, as part of the symbol interpolation, are defined in memory so that when called, the location in which the actual code resides in memory can be accessed. When the system call, for example, makes the read system call, the read call takes the pointer to the address and another pointer to the read function.

As another example, the aforementioned database call might be in a library (e.g., libmysql client library), where there is a symbol for the function of performing the database call. In order to perform the function call, symbol interpolation maps the function to a location in memory in the final executable (where the interpolation generates a table that includes the location of where the code for a function resides).

Thus, as described above, the list of symbols present in the Mono runtime binary and any linked libraries is obtained and placed in a table with the address to the code for implementing the functions. The list of symbols in the binary is combined with the list of symbols of the kernel portion of the unikernel, and included in the same reference table. Thus, the table combines symbols for both the operating system portion of the unikernel and any binaries needed to run the user application.

The disk image further includes code for jumping into the starting point of the binary to be executed as a unikernel. For example, the loader also provides the memory locations for entering the Mono runtime (e.g., c-entry point). Thus, the loader, when executed, jumps into the (pre-defined) c-entry point of the Mono runtime ELF that is loaded. In some embodiments, the loader also allocates memory for the Mono runtime.

In this example, the Mono runtime that is included in the disk image is a standalone object that is statically linked. As will be described in further detail below, if the linking of the Mono runtime is to be performed dynamically, then a linker is also included in the unikernel disk image, which will also perform dynamic library linking as well as the symbol resolving described above.

The disk image further includes system code for executing the EMR PE32 application, after the c-entry point of the Mono runtime is jumped into. For example, at runtime, the unikernel system allocates memory for the ELF Mono runtime binary. Arguments are passed to the Mono runtime, including the path of the EMR PE32 application. The Mono runtime may also expect other types of arguments, which may be stubbed as needed. Further, any environment variables (e.g., debug build) can be set (e.g., toggled on or off). The PE32 EMR application binary will then be interpreted and executed by the Mono runtime. Thus, the EMR application is running as a unikernel.

The system code further included in the disk image to be executed at runtime includes runtime specific code. The runtime specific code includes those portions of an operating system (e.g., runtime environment) needed to execute the EMR application provided by the user and to be run as a unikernel. The unikernel runtime code includes the code for controlling how system calls interact with drivers, support the network and the file system, etc. For example, while the libraries linked to the user application may include system call definitions, the runtime code will include the implementations of the system calls. This includes code that will, during runtime of the application, perform underlying background operations such as communicating with disk, communicating with networking, implementing virtual memory, or generally allowing the user application to interact with other parts of the unikernel system.

The runtime code includes code for establishing a file system, which includes putting in files needed by the EMR application (e.g., files for static assets, pictures, code, SSL certifications, locale files, etc.). Further, code for reading disk sectors, handling interrupts, and handling system calls is included. As another example, code for supporting drivers (e.g., block drivers, device drivers, etc.), networking, virtio, PCI, etc. is included in the disk image. The runtime code also includes code for performing reference counting on objects, garbage collection, etc. If a hypervisor that the image is to be run on is specified by the user, any drivers needed to talk to the hypervisor are also included in the unikernel disk image being generated in the build environment. This runtime code is used to implement any of the services or system calls requested by the EMR application/Mono runtime.

The following is one example of how the runtime code will implement the actions requested by the EMR application, during runtime. For example, when the EMR application is running, suppose that it needs to communicate with a database. In this example, the database is not running in the EMR application, but, for example, in a different application, across a network. In order to execute the database communication, a "send" system call needs to be executed to send data to a remote host on which the database application is executing. When the "send" system call is made, the runtime code picks up the system call, and implements the system call by communicating with services or hardware using drivers. Such calls and interactions during program execution are supported by the unikernel runtime code included in the disk image.

In some embodiments, the runtime code will also include a system call handler (e.g., for trapping user function calls and then executing the appropriate kernel system calls needed to implement the user calls).

Thus, the runtime code includes portions of a kernel that a typical operating system would be expected to provide during program execution. Whenever the code of the EMR application performs a function such as sending data (via the Mono runtime), the unikernel runtime code picks up any system calls and takes control of implementing the instruction by communicating with networking, the file system, etc., or otherwise mediating or governing the interaction that occurs between system calls and drivers to ultimately implement actions requested by the EMR application/Mono runtime.

In the unikernel, which is a single address space system, the user application code will reside in the same memory and address space as the runtime code (e.g., kernel code).

Thus, as described above, in order to implement the services requested by the EMR application during runtime (e.g., requested via system calls made by the Mono runtime), portions of the underlying kernel of an operating system are also included in the disk image at build time. In the unikernel environment, only the minimum portions of the kernel needed to run the application are included. For example, typical web applications that are deployed need only to communicate with the disk and the network, and while the disk and network drivers are included in the unikernel image, other components that are typically included in an operating system, such as universal serial bus (USB) drivers, sound drivers, mouse drivers, etc. can be excluded from the unikernel image. Other portions of the OS kernel may be excluded, such as those components related to inter-process communications, as multiple processes are not allowed. Kernel portions related to shared memory are also not needed. For example, due to the unikernel (which will be run, for example, on a vm) being a single process system, cross-process communication within the system is not allowed. If two processes are to talk to each other, then they are implemented as two different virtual machines (running two different unikernels). Thus, a single vm will not have multiple processes running on it. The two vms would communicate across the network (e.g., using network drivers, which would be included in the unikernel image), rather than through inter-process communication (and thus, those portions of a traditional operating system related to inter-process communication may be excluded from the unikernel image). However, while multiple processes are not supported, the unikernel may be configured to support multiple threads (e.g., a multi-threaded process).

To access the system (kernel layer) code, libraries such as libc are used by binaries such as the Mono runtime. The libc library provides an interface between the kernel components of the unikernel system and the user application program. Ultimately, system calls such as read and write will take data provided as input by the program and call out the kernel components of the unikernel (e.g., the unikernel runtime will capture the system calls) and implement them, for example, by writing out to devices using drivers, writing to a network, managing memory, etc. Libc includes the functions that make system calls out to the kernel to provide services to implement the function calls.

The libc library provides an intermediary between the kernel portions of the unikernel and the user program. In the unikernel, both layers are supported in the same space. For example, libc has functions that make system calls out to a kernel (e.g., via the POSIX API) to perform a service. While some of the kernel calls are stubbed out because they are not needed (e.g., fork, which is not allowed in the single process unikernel), the library functions themselves are reused.

For example, the library may include functions that are not system calls. Consider a database such as MySQL or Postgres. Typically, the user application will link to a library such as libmysqlclient—the library will be linked to the user program so that the user application can communicate with a database. The end user who wrote the user program is not expected to write the code to interface with the database—they simply need to include the libmysqlclient library that allows the application to call various functions in that library. That library is reusable code.

As described above, due to the characteristics of the unikernel environment, some portions of a typical operating system are not needed, and are excluded from the disk image. With respect to system calls, a typical operating system may include hundreds of system calls, not all of which will be needed by the unikernel being built. In some embodiments, while the declarations of all of the system calls are obtained (because at least the declarations may be expected by the Mono runtime), the definitions of those system calls that are not needed are stubbed out (i.e., the unikernel runtime code in the disk image supports only a subset of all of the system calls that might be supported by a typical operating system). For example, system calls related to forking (which creates new child processes) are stubbed out (or otherwise removed), since the unikernel is a single process system, and child processes are not allowed. Further, certain system call libraries are also not needed, such as those related to semaphores, process signaling, etc.

In addition to stubbing, other modifications to system calls may be made. For example, system calls may be rewritten to allow encryption to be performed on-the-fly on reads and writes. Thus, as described above, supporting the interaction between system calls and drivers may include modifying, duplicating, or stubbing out system calls that interact with drivers.

In the unikernel environment, which is a single address space system, there is no distinction between user space and kernel space (i.e., no special status is given to those functions that would traditionally be considered specific to the unikernel), such that a system call is made in the same space as user application calls. As described above, this provides various performance enhancements (e.g., faster execution/processing speed), as context switching between user space and kernel space is no longer needed. The runtime, which also includes only those portions of a traditional operating system or kernel that are required to run the user application, is also more lightweight, as function calls are made in the same space as user application calls. Also, there is no switching of stacks, and the memory is set up such that there are no other programs running.

The unikernel runtime code also includes code for initializing/setting up virtual memory. Virtual memory is implemented to support the addressing of more than 4 GB of RAM (random access memory). This allows 64 bit applications to be run. Further, to support virtual memory (where the address space is not directly mapped to physical memory but to a virtual address space), paging is also supported.

As described above, in traditional multi-process operating systems such as Linux, which support multiple processes, there are various memory barriers in the address space for different programs, kernel space, etc. (i.e., different processes will have different virtual address spaces). The memory barriers are to prevent one program from accessing another program's memory space and to ensure that processes do not overwrite each other's memory addresses. Context switching (e.g., between user space and kernel space and/or between processes) is performed in such multi-process operating systems. Unikernels, when deployed, are isolated, single process systems. Thus, such context switching need not be performed, and the overhead to managing different address spaces is removed, resulting in faster and more efficient running of the application. In the case of the unikernel, there is also no separation between kernel space and user space, and thus "system calls" or kernel functions are executed in the same space as the user application (i.e., since it is known that there is only one program being run, there is no need for memory barriers, well-defined page boundaries, or context switching).

In some embodiments, the code included in the disk image includes a file system. In some embodiments, the file system is appended to the end of the disk image so that it can grow. The file system may include a list of files. The file system may be heavily stubbed. For example, a program or application may expect various items from a file system, but not all portions of a traditional file system may be needed. For example, suppose that the EMR application is a web application. The file system may include those portions needed to support the EMR application, such as pictures or other static assets, code to be interpreted, as well as other files such as SSL certificates, locale files, etc. In some embodiments, the build engine is configured to cache such files that are typically found on a file system. Daemons to be installed in the build environment may also be obtained.

Multiple file systems may be mounted or otherwise associated with the unikernel/virtual machine being built. For example, multiple file systems may be attached to accommodate different types of files associated with the unikernel, such as system type files, configuration files (which may or may not change dynamically), and configuration information. In the examples described herein, the file systems used are similar in structure to those utilized on other operating systems (e.g., file system in Linux or BSD), with libraries placed in certain locations in the file system so that they may be accessible by the application.

Code for implementing block storage for the file system is also included in the disk image. A utility for creating a file system layout may be used. Code for a storage system is also included in the disk image. Other code may be added to the disk image, such as debugging code (e.g., dwarf), to determine, for example, the line number that a function is called at during runtime. Thus, for example, if a user is running the unikernel in production and a problem occurs, the line at which the error occurred can be reviewed for troubleshooting. As another example, code is included in the disk image that will map memory for the Mono runtime binary. Code for starting a process for the Mono runtime is also included. The runtime code included in the disk image also includes code for handling interrupts such as those for handling faults (e.g., divide by zero, double fault, invalid op code, floating point exceptions, etc.). The runtime code also includes code for starting threads. In some embodiments, the unikernel runtime has its own thread.

The various runtime code described above to be executed is compiled together into the unikernel disk image being generated. With the unikernel runtime code incorporated into the unikernel disk image, the Mono runtime and the user application binary (EMR application binary) are then also included in the unikernel disk image, for example, using merge engine 120.

Merge engine 120 is configured to append or mount the Mono runtime and PE32 binary to the disk image containing the unikernel system code (e.g., bootloader and runtime). In some embodiments, the unikernel system code forms one binary, while the Mono runtime and PE32 are additional binaries. As one example, the Mono runtime binary and the PE32 EMR binary are concatenated with the unikernel disk image including the system code. For example, rather than cross compiling code, as in existing techniques, the Mono runtime and PE32 are tacked onto the tail of the disk image. The PE32 that is appended to the disk image is also pointed to so that it can be interpreted by the Mono runtime.

In some embodiments, the Mono runtime does not reside on the file system mounted to the disk image, because it is integrated with the kernel portion of the unikernel (since they will operate in the same space). Instead of loading the Mono runtime off of the file system, the file system is faked or spoofed to make it appear as if the Mono runtime is in the file system.

Thus, an enclosed unikernel system is generated that includes the binary of the EMR application, the binary of the Mono runtime interpreter needed to execute the byte code of the .NET assembly, as well as the minimal set of components required to run the user application as a unikernel. For example, the unikernel is an all-enclosed system that includes all the components needed to load, read, and execute the binary provided by the user. Thus, the disk image includes the user application and a lightweight unikernel runtime to control execution of the program as a virtual machine (where the unikernel runtime includes only those portions of a traditional kernel or operating system that are required by the user program to execute). The generated disk image is portable, and can be taken to any hypervisor to be loaded up. Examples of hypervisors include VirtualBox, QEMU, ESX, Zen, etc. The raw disk image can also be written to a raw device.

As shown in this example, the unikernel is built by building a disk image that includes different binaries together on the disk image. As shown in this example, the PE32 EMR binary was not modified at all as part of the build process, and access to the source code of the EMR application was not needed to build the unikernel (minimal virtual machine image).

Deploying the Unikernel

The complete unikernel disk image (including the unikernel system code, EMR binary, and Mono runtime binary) is then provided as output. The unikernel disk image is now portable, and can be provisioned by spinning it up on a hypervisor. The disk image may be spun up on multiple virtual machines if many instances of the application need to be run. When spun up, the hypervisor executes the code that was incorporated into the unikernel disk image.

In this example, the unikernel system boots according to the bootloader code included in the disk image. The loader that was included in the disk image then loads the Mono runtime (using the c-entry point of the ELF Mono runtime), resulting in the Mono runtime being loaded on a virtual machine. The EMR PE32 .NET assembly is then passed to the Mono runtime as an argument, where the EMR application is then executed. Thus, the unikernel boots directly into the EMR application. The Mono runtime interprets the .NET assembly into object code that runs on the virtual machine. Any system calls made by the EMR application (or by libraries linked to the EMR either at build time or at runtime) are captured by the unikernel runtime code included in the disk image, which controls the interaction of the system calls with drivers and other components typically associated with the kernel portion of an operating system.

For example, suppose that a doctor is an end user of the EMR application (running on the hypervisor as a unikernel). The doctor is updating the medical information for a patient (e.g., their weight, blood level, etc.). When the update occurs, the update is sent to the server (e.g., vm) that is running the EMR application itself (as a unikernel). The data now is needed to be inserted into a database to save the patient details. As part of the database save by the application (which, for example, is a library call that conforms to the POSIX (portable operating system interface) standard), various system calls are made to execute the database save, such as send, receive, etc. The implementation of these system calls are part of the unikernel runtime code that was previously inserted into the disk image. Each of the system calls further communicates with drivers (e.g., networking drivers), which were also set up as part of the unikernel runtime portion of the disk image.

In one embodiment, the unikernel is deployed on an infrastructure provided by unikernel platform 106, for example, in a public facing sandbox provided by platform 106. As another example, the unikernel is deployed or implemented on an on premises infrastructure (e.g., of a customer or subscriber of unikernel platform 106), behind a firewall. For example, the user is given a version of the system that they can run on their own hardware. As one example, an ipxe provisioning system is provided as output, which allows the specification of disk images when a computer boots up, allowing the computer to boot into the unikernel as a vm. A license may be obtained/provided to perform the on-premise deployment of the unikernel.

Dynamic Linking of the Mono Runtime

In the above example of FIG. 1, the dynamically linked Mono runtime executable was transformed, during build time, into a standalone, statically linked binary object, where the standalone object was then appended into the unikernel disk image. As described above, this is one option for linking the Mono runtime binary.

As another option, the Mono runtime is dynamically linked at runtime, when the unikernel is deployed and initializing. In this option, rather than converting the Mono runtime at build time, the disk image is set up to perform the linking/symbol resolving dynamically, at runtime.

For example, referring to the example of FIG. 1, because the user application binary is in a .NET assembly format known to be compatible with the Mono runtime, a pre-built Mono environment is loaded onto the unikernel disk image (e.g., using the merge engine 120 as described above). A linker is also included in the unikernel disk image when the disk image is being built. When the unikernel is booted up as a virtual machine at runtime (e.g., in virtualbox), the dynamically linked Mono runtime is loaded (e.g., via the ELF loader included in the unikernel disk image). The Mono runtime is then dynamically linked by the linker. Symbol resolution is also performed dynamically, as well as memory layout preparation. In some embodiments, any libraries that are needed are included in the file system so that the libraries may be copied over during the linking process. By performing the linking dynamically, no intermediate binaries need be created (e.g., the dynamically linked binary need not be converted into a standalone, statically linked binary).

After the required libraries are linked to the Mono runtime binary, the linked Mono runtime is then run (e.g., by entering the c-entry point of the Mono runtime), where the path of the EMR application PE32 binary is passed as an argument to the Mono runtime. The Mono runtime then loads the PE32 binary and runs the EMR application, as described above.

Thus, the linking and resolving can be performed as part of the disk image generating process, or performed dynamically at bootup of the unikernel.

In some embodiments, the user that wishes to build the unikernel disk image is presented, during build time, the option of having the Mono runtime (or their user binary) converted to a statically linked binary, or to have the Mono runtime loaded up in memory at runtime and the library linking performed dynamically. One reason that a user may specify dynamic linking is to perform debugging.

Ad-Hoc Binary Conversion to Unikernel

As shown in the example of FIG. 1, a .NET application can be run as a unikernel. Other applications for which there is no access to source code, such as SAP Hana, SQL Server, etc., can be loaded and run as a unikernel. Another example of an application that can be run as a unikernel using the techniques described herein is a SQL server (for which access to the source code is usually not provided).

In the above example, the user provided the EMR application, which was in .NET assembly format and required a .NET runtime. The .NET Mono runtime was then included in the unikernel disk image as described above, where at deployment time, the .NET runtime was first loaded, and where the loaded .NET runtime was then used to ultimately load and execute the EMR application. In the above example of FIG. 1, the .NET runtime was explicitly supported to allow it to load up the user .net assembly binary. Other examples of binaries that have runtimes include those that rely on JVM runtime interpreters, which also interpret byte code.

Other applications need not be loaded in multiple stages (e.g., by first loading a runtime or interpreter which then in turn loads the user application or program to be run). Instead, these binaries can be entered into directly. One example of such an application that does not require a separate runtime to perform interpreting is one written in the GO programming language.

In the GO example, when building the unikernel and converting the GO binary into a unikernel, the user GO binary is still received by platform 106. The source code may not be accessible. Nonetheless, the user application binary may be converted into a unikernel. For example, as described above, a disk image is generated that includes unikernel system code such as a bootloader, runtime code including minimal portions of the kernel of an operating system for facilitating interactions with drivers, file systems, networking, etc. The disk image will also include a loader for loading the GO binary. In the .NET example, the c-entry point of the Mono runtime was identified and jumped into, and the PE32 was not accessed directly. In the GO binary use case, the GO binary itself, when loaded by the loader, can be jumped into at its c-entry point (and thus, multi-stage loading of the user application need not be performed, as in the .NET example).

As described above, if the user application is received as a dynamically linked binary, the binary can be linked at disk image build time or dynamically at runtime (e.g., by including a linker in the disk image). In some cases, statically linked GO binaries are provided, in which case the processing described above to allow an application binary to be linked is not required and is not performed (e.g., no linking at build time or dynamically at runtime).

If the dynamically linked binary is converted into a statically linked binary at unikernel build time, then the standalone statically linked binary is then appended to the unikernel disk image that includes the unikernel runtime portion, generated, as described above, using unikernel disk image generator 118. If the user binary is to be linked at runtime, the dynamically linked binary is still concatenated to the disk image including the unikernel bootloader and unikernel runtime. As described above, this provides a clean separation between the underlying unikernel implementation used to support the user application binary. Further, the user binary need not be modified at all. If the user's binary runs on another operating system, such as Linux, then if any issues arise in the deployment of the unikernel, they can be isolated to the unikernel portion of the system.

Thus, using the techniques described herein, arbitrary or ad hoc binaries (e.g., in the executable and linkable format) can be converted into unikernel virtual machines, without requiring access to a source code. Instead, unikernels are built by converting existing binaries into unikernel virtual machines.

Figure 2:
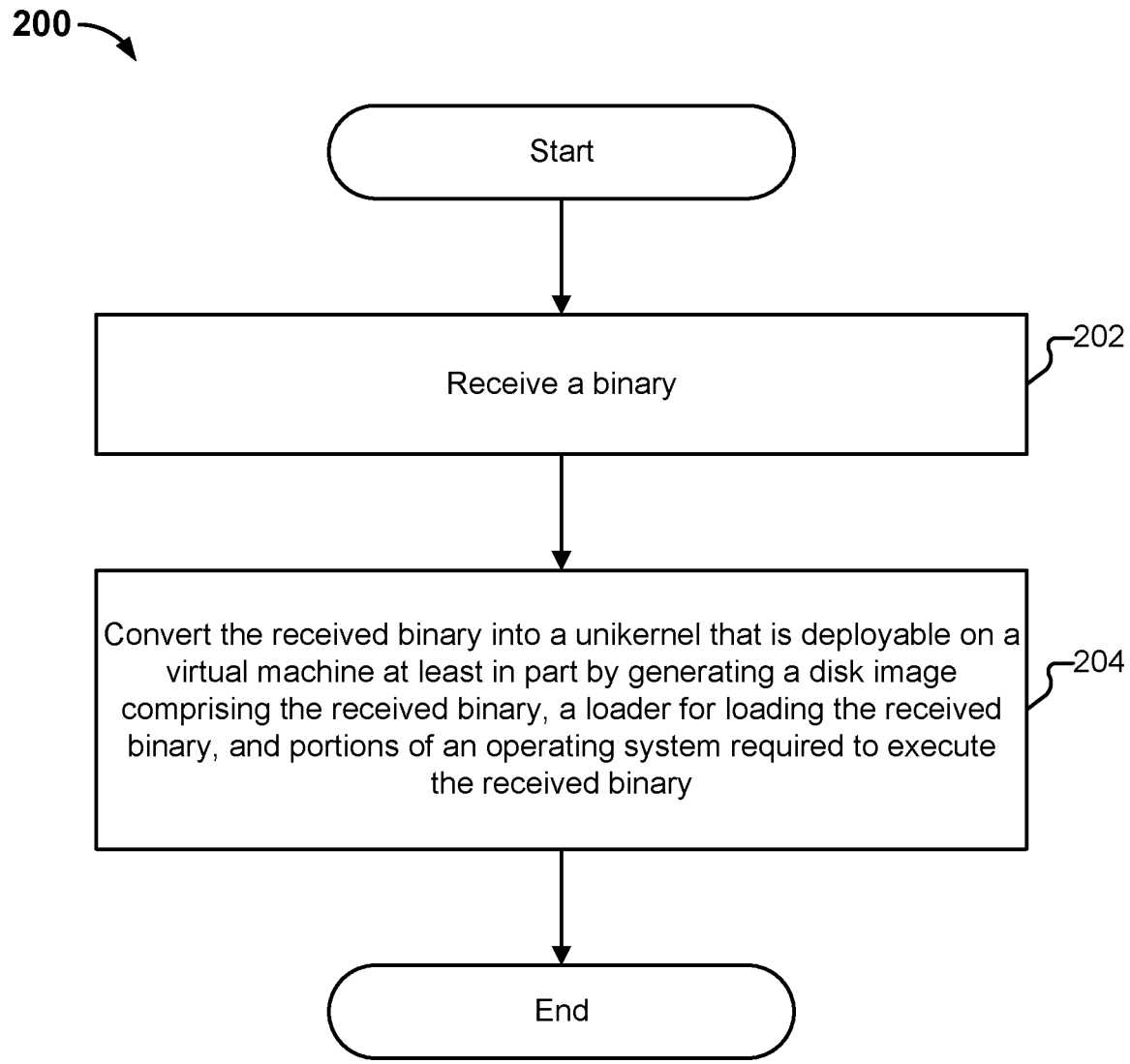
FIG. 2 is a flow diagram illustrating an embodiment of a process for converting a binary into a unikernel.

FIG. 2 is a flow diagram illustrating an embodiment of a process for converting a binary into a unikernel. In some embodiments, process 200 is executed by unikernel platform 106 of FIG. 1. The process begins at 202 when a binary is received. As one example, an executable file or object code such as a file in the ELF (executable and linkable format) is received. At 204, the received binary is converted into a unikernel that is deployable on a virtual machine. The binary is converted into a unikernel by generating a disk imagine that includes the received binary, a loader for loading the received binary, and portions of an operating system required to execute the received binary. Generating the disk image includes creating a disk image that includes the loader and the required portions of the operating system, and then concatenating or otherwise appending the received binary to the disk image to form the final disk image of the unikernel. As one example, the make command is used to append or concatenate the received application binary onto the portion of the unikernel disk image that includes the underlying portions of the OS required to execute the received application binary. This causes, for example, the received binary to be tacked onto the end of the binary including the unikernel infrastructure (code for booting up the unikernel and required portions of the OS for supporting execution of the received binary).

The portions of the operating required to execute the binary include minimum portions of the kernel of a typical operating system that are needed to run the binary, as described above. The disk image, which is a standalone file, may be provided as output to be deployed. As one example, the unikernel may be run directly on hardware (e.g., bare metal). As another example, the unikernel is deployed on servers implemented as virtual machines (e.g., the unikernel image is run on a hypervisor), where the unikernel boots directly into the application. As described above, unikernels may be booted into a targeted hypervisor, such as kvm, esx, xen, etc.

The binary that is received at 202 may be received as a dynamically linked binary. In one embodiment, when building or generating the unikernel disk image, the dynamically linked binary is converted into a standalone statically linked binary, where the generated disk image includes the standalone statically linked binary. As one example, converting the dynamically linked binary into the standalone statically linked binary includes loading the received binary in memory, linking the loaded binary with a set libraries, and obtaining a snapshot of the linked binary. The snapshot is outputted as the standalone statically linked binary. The standalone statically linked binary is then included in the disk image.

In another embodiment, rather than converting the dynamically linked binary at build time, the dynamically linked binary is included in the disk image of the unikernel. A linker is also included in the disk image. At runtime (e.g., when the unikernel is deployed on a hypervisor), the linker, when executed, links any required libraries to the dynamically linked binary (where the libraries to be linked in are also included in the disk image).

In some cases, bytecode is received at 202 (which may also be received in the form of a binary). For example, .NET bytecode is received (e.g., in the form of a PE32 format binary, as in the example of FIG. 1). Such bytecode may require a separate interpreter/runtime to execute the bytecode at runtime. In this scenario, the appropriate interpreter/runtime is also received at 202 (where the runtime/interpreter is also received as a binary or other executable object). Both the bytecode and the interpreter/runtime are appended to the disk image being generated. In some embodiments, the received interpreter/runtime is received as a dynamically linked binary (e.g., in the ELF format). The dynamically linked binary may be converted into a standalone statically linked binary (which is included in the disk image) or a linker for dynamically linking the interpreter at runtime may also be included in the disk image (to dynamically link the interpreter/runtime at deployment), as described above. The bytecode may not need to be linked with libraries (since it resides in the interpreter when executed). The disk image is configured to include code that when executed, loads the interpreter included in the disk image and provides a path to the bytecode as an argument to the interpreter. The interpreter/runtime is then configured to execute the bytecode.

Figure 3:
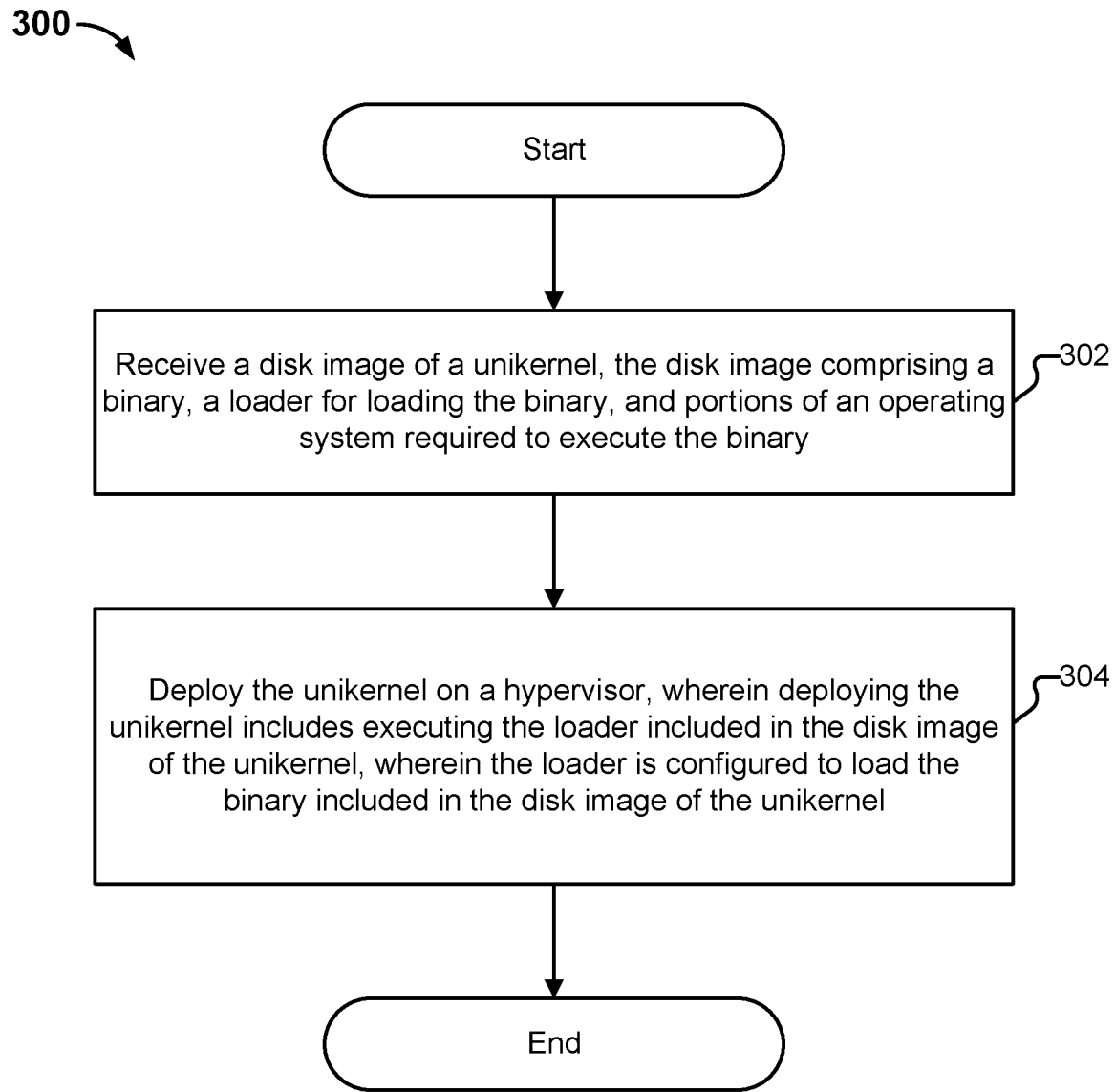
FIG. 3 is a flow diagram illustrating an embodiment of a process for deploying a unikernel converted from a binary.

FIG. 3 is a flow diagram illustrating an embodiment of a process for deploying a unikernel converted from a binary. In some embodiments, a unikernel is deployed in process 300 as a virtual machine by executing a disk image generated using process 200 of FIG. 2 on a hypervisor.

For example, at 302, a unikernel disk image is received that includes a binary (as well as any runtimes needed to interpret the user binary), a loader for loading the binary (which may be a runtime for another binary to be executed), and portions of an operating system required to execute the user binary.

At 304, the received unikernel disk image is deployed, for example, by spinning the disk image up on a hypervisor. The unikernel is deployed as a virtual machine, where it is booted up (e.g., using a bootloader included in the disk image). As part of the unikernel startup process, the loader included in the disk image is used to load the binary. The application associated with the binary is then started by entering, for example, into the c-entry point of the loaded binary. If the binary is of an interpreter that is used to execute code (e.g., bytecode) of another binary (also included in the disk image), then the interpreter is loaded and entered into. The path to the bytecode binary is then passed as an argument to the interpreter. The bytecode is then executed and run by the interpreter. As one example, the bytecode is a .NET assembly, and the interpreter is a .NET runtime/interpreter for executing the .NET assembly or bytecode.

If the binary (which may be an interpreter used to execute another binary) included in the unikernel disk image is still dynamically linked (e.g., because the binary was not converted to a statically linked, standalone object during the build process, as described above), then a linker included in the disk image is used to dynamically link the binary (or interpreter/runtime) to any needed libraries (which are also included in the disk image).

Thus, as described above, an ad hoc binary can be converted to a unikernel. Using the techniques described herein, a clean separation between the unikernel runtime and the user's application is facilitated when converting an application into a unikernel, where the user binary need not be touched or modified at all during the build process. Instead, for example, the user's binary (and/or runtimes needed to support the runtime as in the .NET example above) is loaded up, headers are interpreted, a list of variables and symbols are read, library linking is performed, etc. This further increases the type of programs that can be supported as unikernels, as binaries can be converted into unikernels, without requiring access to users' application source code. For example, in previous unikernel build techniques, the c-entry point of the application being run was munged or overwritten, which would impact, for example, debugging, memory addressing, etc. For example, typically the start point of the user application would be modified to link against determined portions of an operating system (e.g., to include libraries). Further, all libraries need to be known at compile time in existing cross-compilation techniques. Using the techniques described herein, such overwriting or modification of the user application (or any support application) need not be performed. Further, compared to existing techniques, cross-compiling need not be performed, and multiple environments for different languages need not be supported.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive a binary, wherein the received binary comprises a dynamically linked binary; and
convert the received binary into a unikernel that is deployable on a virtual machine at least in part by generating a disk image comprising the received binary, a loader for loading the received binary, portions of an operating system required to execute the received binary, and a dynamic linker, wherein the dynamic linker is configured to dynamically link the received binary at runtime; and
a memory coupled to the processor and configured to provide the processor with instructions.

2. The system of claim 1, wherein generating the disk image comprises concatenating the received binary to a portion of the disk image comprising the loader for loading the received binary and the portions of the operating system required to execute the received binary.

3. The system of claim 1, wherein the processor is further configured to:
receive bytecode to be executed by an interpreter, wherein the received binary comprises the interpreter for executing the received bytecode; and
include the interpreter and the received bytecode in the generated disk image.

4. The system of claim 3, wherein the generated disk image comprises a loader for loading the interpreter and portions of an operating system required to execute the interpreter.

5. The system of claim 4, wherein the received bytecode and the interpreter are concatenated to a portion of the disk image comprising the loader for loading the interpreter and the portions of the operating system required to execute the interpreter.

6. The system of claim 3, wherein the disk image further includes code, which when executed at runtime, causes a path of the received bytecode to be provided as an argument to the interpreter.

7. The system of claim 3, wherein the received bytecode comprises .NET bytecode, and wherein the interpreter comprises a .NET interpreter.

8. A method, comprising:
receiving a binary, wherein the received binary comprises a dynamically linked binary; and
converting the received binary into a unikernel that is deployable on a virtual machine at least in part by generating a disk image comprising the received binary, a loader for loading the received binary, portions of an operating system required to execute the received binary, and a dynamic linker, wherein the dynamic linker is configured to dynamically link the received binary at runtime.

9. The method of claim 8, wherein generating the disk image comprises concatenating the received binary to a portion of the disk image comprising the loader for loading the received binary and the portions of the operating system required to execute the received binary.

10. The method of claim 8, further comprising:
receiving bytecode to be executed by an interpreter, wherein the received binary comprises the interpreter for executing the received bytecode; and
including the interpreter and the received bytecode in the generated disk image.

11. The method of claim 10, wherein the generated disk image comprises a loader for loading the interpreter and portions of an operating system required to execute the interpreter.

12. The method of claim 11, wherein generating the disk image comprises concatenating the received bytecode and the interpreter to a portion of the disk image comprising the loader for loading the interpreter and the portions of the operating system required to execute the interpreter.

13. The method of claim 10, wherein the disk image further includes code, which when executed at runtime, causes a path of the received bytecode to be provided as an argument to the interpreter.

14. The method of claim 10, wherein the received bytecode comprises .NET bytecode, and wherein the interpreter comprises a .NET interpreter.

15. A computer program product embodied in a non-transitory computer readable storage medium and comprising computer instructions for:
receiving a binary, wherein the received binary comprises a dynamically linked binary;
and
converting the received binary into a unikernel that is deployable on a virtual machine at least in part by generating a disk image comprising the received binary, a loader for loading the received binary, portions of an operating system required to execute the received binary, and a dynamic linker, wherein the dynamic linker is configured to dynamically link the received binary at runtime.

16. A system, comprising:
a processor configured to:
receive a binary;
receive bytecode to be executed by an interpreter, wherein the received binary comprises the interpreter for executing the received bytecode; and
convert the received binary into a unikernel that is deployable on a virtual machine at least in part by generating a disk image comprising the received binary, a loader for loading the received binary, portions of an operating system required to execute the received binary, the interpreter, the received bytecode, and code, which when executed at runtime, causes a path of the received bytecode to be provided as an argument to the interpreter; and
a memory coupled to the processor and configured to provide the processor with instructions.

17. The system of claim 16, wherein generating the disk image comprises concatenating the received binary to a portion of the disk image comprising the loader for loading the received binary and the portions of the operating system required to execute the received binary.

18. The system of claim 16, wherein the received binary comprises a dynamically linked binary, wherein the processor is further configured to include a dynamic linker in the generated disk image, and wherein the dynamic linker is configured to dynamically link the received binary at runtime.

19. The system of claim 16, wherein the generated disk image comprises a loader for loading the interpreter and portions of an operating system required to execute the interpreter.

20. The system of claim 19, wherein the received bytecode and the interpreter are concatenated to a portion of the disk image comprising the loader for loading the interpreter and the portions of the operating system required to execute the interpreter.

21. The system of claim 16, wherein the received bytecode comprises .NET bytecode, and wherein the interpreter comprises a .NET interpreter.

22. A method, comprising:
receiving a binary;
receiving bytecode to be executed by an interpreter, wherein the received binary comprises the interpreter for executing the received bytecode; and
converting the received binary into a unikernel that is deployable on a virtual machine at least in part by generating a disk image comprising the received binary, a loader for loading the received binary, portions of an operating system required to execute the received binary, the interpreter, the received bytecode, and code, which when executed at runtime, causes a path of the received bytecode to be provided as an argument to the interpreter.

23. The method of claim 22, wherein generating the disk image comprises concatenating the received binary to a portion of the disk image comprising the loader for loading the received binary and the portions of the operating system required to execute the received binary.

24. The method of claim 22, wherein the received binary comprises a dynamically linked binary, and further comprising including a dynamic linker in the generated disk image, and wherein the dynamic linker is configured to dynamically link the received binary at runtime.

25. The method of claim 22, wherein the generated disk image comprises a loader for loading the interpreter and portions of an operating system required to execute the interpreter.

26. The method of claim 25, wherein generating the disk image comprises concatenating the received bytecode and the interpreter to a portion of the disk image comprising the loader for loading the interpreter and the portions of the operating system required to execute the interpreter.

27. The method of claim 22, wherein the received bytecode comprises .NET bytecode, and wherein the interpreter comprises a .NET interpreter.

28. A computer program product embodied in a non-transitory computer readable storage medium and comprising computer instructions for:
receiving a binary;
receiving bytecode to be executed by an interpreter, wherein the received binary comprises the interpreter for executing the received bytecode; and
converting the received binary into a unikernel that is deployable on a virtual machine at least in part by generating a disk image comprising the received binary, a loader for loading the received binary, portions of an operating system required to execute the received binary, the interpreter, the received bytecode, and code, which when executed at runtime, causes a path of the received bytecode to be provided as an argument to the interpreter.

* * * * *